US010019251B1

(12) United States Patent
Montgomery et al.

(10) Patent No.: US 10,019,251 B1
(45) Date of Patent: Jul. 10, 2018

(54) SECURE PACKAGING SOFTWARE AND DEPLOYMENT SYSTEM

(71) Applicant: Bank of America Corporation, Charlotte, NC (US)

(72) Inventors: Matthew Montgomery, Garland, TX (US); Dave Cook, Matthews, NC (US); Rebecca Zeckoski, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 15/081,893

(22) Filed: Mar. 27, 2016

Related U.S. Application Data

(60) Provisional application No. 62/246,666, filed on Oct. 27, 2015.

(51) Int. Cl.
*G06F 9/44* (2018.01)
*G06F 8/65* (2018.01)
*G06F 17/24* (2006.01)
*G06F 8/61* (2018.01)
*G06F 21/62* (2013.01)
*G06F 3/0484* (2013.01)
*G06F 3/0482* (2013.01)

(52) U.S. Cl.
CPC .............. *G06F 8/65* (2013.01); *G06F 3/0482* (2013.01); *G06F 3/04842* (2013.01); *G06F 8/61* (2013.01); *G06F 17/246* (2013.01); *G06F 21/629* (2013.01)

(58) Field of Classification Search
None
See application file for complete search history.

(56) References Cited

U.S. PATENT DOCUMENTS

| 6,988,241 | B1 * | 1/2006 | Guttman ............... G06F 17/246 707/E17.115 |
| 7,124,104 | B2 | 10/2006 | Casciano et al. |
| 7,729,979 | B2 | 6/2010 | Lee |
| 8,065,214 | B2 | 11/2011 | Keyes et al. |
| 8,131,637 | B1 | 3/2012 | Rupp et al. |
| 8,417,606 | B2 | 4/2013 | Butcher, III et al. |
| 8,577,791 | B2 | 11/2013 | Malov et al. |

(Continued)

OTHER PUBLICATIONS

"Click Once," Oct. 12, 2015, Wikimedia Foundation, Inc.

(Continued)

*Primary Examiner* — Chameli Das
(74) *Attorney, Agent, or Firm* — Weiss & Arons LLP; Michael A. Springs, Esq.

(57) ABSTRACT

A security software packaging and deployment system is provided. The system may provide a platform for communication between ClickOnce and a Microsoft Excel™ spreadsheet via a computer-readable language. The system may also include a three-tiered security module. A first tier may delete the combination application upon receipt of an unauthorized attempt to access the combination application. A second tier may terminate the combination application if a predetermined file is unavailable. A third tier may encode a password of the spreadsheet in a mathematical formula; and store the decrypt key in a non-descriptive variable name. The system may include an administration module. The administration module may enable an administrative user to emulate a non-administrative user and log into the combination application as one of a plurality of roles.

21 Claims, 16 Drawing Sheets

```
Method D:
Dim CPTExcelClass As CPTExcel
Dim usfEnvironmentValue As String
Dim usfResponse As Boolean
If Not gblsDev Then
    ' Call the USF webservice to check the user's permissions
    Set CPTExcelClass = New CPTExcel
    ' call this method to set gbUsfAppId
    usfEnvironmentValue = CPTExcelClass.GetUsfEnvironmentValue
    usfResponse = GetUSFRole(UCase(Environ("USERNAME")))
    Set CPTExcelClass = Nothing
    If Not usfResponse Then
        MsgBox "You are not authorized to use this application.", vbOKOnly, "Invalid User"
        mbKillingCPT = True
        With ThisWorkbook
            .Saved = True
            .ChangeFileAccess xlReadonly
            Kill .FullName
            .Close False
        End With
    Else
        mbKillingCPT = False
    End If
Else
    mbKillingCPT = False
End If
```

(56) References Cited

U.S. PATENT DOCUMENTS

| | | | | |
|---|---|---|---|---|
| 2005/0075910 A1* | 4/2005 | Solankl | ............... | G06Q 40/08 705/4 |
| 2005/0246261 A1* | 11/2005 | Stevens | ............... | G06Q 40/00 705/37 |
| 2007/0174766 A1* | 7/2007 | Rubin | ............... | G06F 17/218 715/234 |
| 2008/0120129 A1* | 5/2008 | Seubert | ............... | G06Q 10/06 705/35 |
| 2009/0031206 A1* | 1/2009 | Aureglia | ............... | G06F 17/246 715/217 |
| 2011/0047069 A1 | 2/2011 | Mustafa et al. | | |
| 2011/0167330 A1* | 7/2011 | Folting | ............... | G06F 17/30489 715/219 |
| 2011/0295720 A1* | 12/2011 | Parikh | ............... | G06F 17/3064 705/27.1 |
| 2012/0216001 A1* | 8/2012 | Ramly | ............... | G06F 21/87 711/163 |
| 2012/0331088 A1* | 12/2012 | O'Hare | ............... | G06F 21/6227 709/214 |
| 2015/0026039 A1 | 1/2015 | Annappindi | | |
| 2015/0310188 A1* | 10/2015 | Ford | ............... | G06F 21/10 726/28 |
| 2016/0110567 A1* | 4/2016 | Rooyakkers | ............... | G06F 21/86 726/34 |
| 2017/0063816 A1* | 3/2017 | Ackerly | ............... | H04L 63/0428 |
| 2017/0116373 A1* | 4/2017 | Ginsburg | ............... | G06F 19/322 |

OTHER PUBLICATIONS

"Click Once," Jan. 8, 2016, Wikimedia Foundation, Inc.

"Spreadsheet," Retrieved on Mar. 2, 2016, Wikimedia Foundation, Inc.

Matthew MacDonald, "Excel 2007: The Missing Manual," 2007, O'Reilly Media, Inc., Sebastopol, California.

* cited by examiner

```
Roles = AuthorizationHelper.GetUserRoles(identity.Name);
Role = AuthorizationHelper.GetUserRole(identity.Name);
```

```
if (Roles == null || !AuthorizationHelper.IsValidRoles(ref Roles))
{
    MessageBox.Show(AppConstants.MessageString.ERROR_NO_ETITLEMENTS,
                AppConstants.Messagestring.ERROR, MessageBoxButtons.OK, MessageBoxIcon.
                Error);
    //delete CPTExcel from their directory if it exists
    AutoUpdater.DestroyCPT(appName);
    Application.Exit();
```

FIG. 1

CALL A:

```
public static IList<string> GetUserRoles(string strNbkId)
{
    IList<string> userRoles = new List<string>();
    IEnumerable<USFRole> usrRole = AuthService.UserRoles(GetNbkId(strNbkId));
    if (usrRole != null)
    {
        foreach (var role in usrRole)
        {
            usrRoles.Add(role.RoleName);
        }
        return usrRoles;
    }
    return null;
}
```

FIG. 2

METHOD B:

```
/// <remarks/>
[System.Web.Services.Protocols.SoapDocumentMethodAttribute("http://www.bank.com/ccs/GetRoleListByAppUserID",
        RequestNamespace="http://www.bank.com/ccs/",
        ResponseNamespace="http://www.bank.com/ccs/",
        Use=System.Web.Services.Description.SoapBindingUse.Literal,
        ParameterStyle=System.Web.Services.Protocols.SoapParameterStyle.Wrapped)]
public System.Data.Dataset GetRoleListByAppUserID(int AppID, string UserID, string SortBy) {
        Object[ ] results = this.Invoke("GetRoleListByAppUserID", new object[ ] {
                AppID,
                UserID,
                SortBy});
        return ((System.Data.Dataset)(results[0]));
}
```

FIG. 3

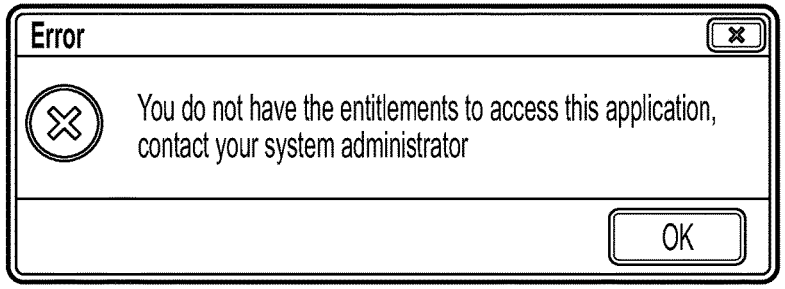

FIG. 4

Method C:

```
Archivo = ThisWorkbook.Path & "\CPTexcel.vsto"
Set fso = CreateObject("Scripting.FileSystemObject")

If Not fso.FileExists(Archivo) Then
        ThisWorkbook.Saved = True
        Application.Quit
End If
```

FIG. 5

Method D:

```
Dim CPTExcelClass As CPTExcel
Dim usfEnvironmentValue As String
Dim usfResponse As Boolean
If Not gblsDev Then
    ' Call the USF webservice to check the user's permissions
    Set CPTExcelClass = New CPTExcel
    ' call this method to set gbUsfAppId
    usfEnvironmentValue = CPTExcelClass.GetUsfEnvironmentValue
    usfResponse = GetUSFRole(UCase(Environ("USERNAME")))
    Set CPTExcelClass = Nothing
    If Not usfResponse Then
        MsgBox "You are not authorized to use this application.", vbOKOnly, "Invalid User"
        mbKillingCPT = True
        With ThisWorkbook
            .Saved = True
            .ChangeFileAccess xlReadonly
            Kill .FullName
            .Close False
        End With
    Else
        mbKillingCPT = False
    End If
Else
    mbKillingCPT = False
End If
```

FIG. 6

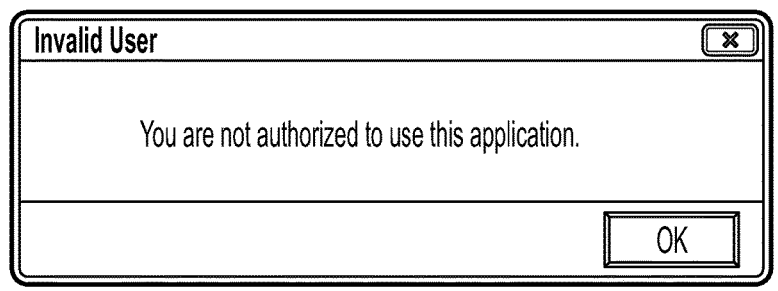

FIG. 7

```
Option Private Module
Option Explicit
Public Const P = "1.1234567890:1.1234567890:10.01234567890:0:123.1234567890"

Public Function DP(s) As String
Dim i As Long
Dim sP() As String
sP() = Split(s, ":")
For i = 0 To UBound(sP())
DP = DP & Round (Log (sP(i) + Sqr(sP(i) * sP(i) + 1)))
Next i
End Function
```

FIG. 8

```
Public Sub ToggleCorp()
  gsMP = " "
  FMP.Show
| If gsMP = DP(P) Then
```

FIG. 9

```
<?xml version="1.0" encoding="UTF-8" standalone="yes"?>
<ns2:clientSearchRequestType
xmlns:ns2="http://www.bank.com/xml/cptexcel/clientSearch/v1"
xmlns="http://bank.com/xml/1234/structureV456">
    <ns2:clientSearchDetails>
        <ns2:primaryGCI>1234567890</ns2:primaryGCI>
        <ns2:LOB>GWIM</ns2:LOB>
    </ns2:clientSearchDetails>
</ns2:clientSearchRequestType>
```

FIG. 10

```
Public Function CreateXMLSearchNONGLPPrimaryGCIString(ByVal sGCI As String, sLOB As String)
    Dim strBuffer As String
    Dim strGCIBuffer As String strBuffer = strBuffer + "<?xml version=""1.0"" encoding=""UTF-8"" standalone=""yes""?>" + vbCrLf
    strBuffer = strBuffer + "<ns2:clientSearchRequestType xmlns:ns2=""http://www.bank.com/xml
    strBuffer = strBuffer + "xmlns=""http://bank.com/xml/123/structureV456"">" + vbCrLf strBuffer =
    strBuffer + "<ns2:clientSearchDetails>" + vbCrLf
    strBuffer = strBuffer + "<ns2:primaryGCI>" + sGCI + "</ns2:primaryGCI>" + vbCrLf
    strBuffer = strBuffer + "<ns2:LOB>" + sLOB + "</ns2:LOB>" + vbCrLf
    strBuffer = strBuffer + "</ns2:clientSearchDetails>" + vbCrLf
    strBuffer = strBuffer + "</ns2:clientSearchRequestType>" + vbCrLf
    CreateXMLSearchNONGLPPrimaryGCIString = strBuffer
End Function
```

FIG. 11

```
Public Function XMLHTTPRequestMethodSearchGCI (ByVal PostData As String, ByVal PostType As string,
Byval Ser
    If PostType = "PUT" Then
        On Error GOTO PutErrorHandler
    ElseIf PostType = "GET" Then
        On Error GOTO GetErrorHandler
    ElseIf PostType = "POST" Then
        On Error GOTO PostErrorHandler
    End If
    Dim xmlHttpRequest As MSXML2.XMLHTTP
    Set xmlHttpRequest = New MSXML2.XMLHTTP Dim XMLDoc As New DOMDocument Dim pCPTExcelErrorHandler As CPTExcelErrorLog
    Set pCPTExcelErrorHandler = New CPTExcelErrorLog
```

FIG. 12

```
Dim success As Boolean xmlHttpRequest.Open PostType, GetEnvironmentValueSearch() + Service, AsynchronousCall
xmlHttpRequest.setRequestHeader "Content-Type", "application/xml"
xmlHttpRequest.setRequestHeader "Accept", "application/xml"
xmlHttpRequest.send PostData If AsynchronousCall = False Then
    If xmlHttpRequest.status >= 300 Then
        Call pCPTExcelErrorHandler.LogError(xmlHttpRequest.statusText, xmlHttpRequest.status)
        XMLHTTPRequestMethodSearchGCI = "failed"
    Else
        XMLHTTPRequestMethodSearchGCI = xmlHttpRequest.responseText
    End If
Else
End If
```

FIG. 12 (Cont.)

```
<?xml version="1.0" encoding="UTF-8" standalone="Yes"?>
<ns2:clientSearchResponseType
xmlns:ns2="http://www.bank.com/xmlschema/cptexcel/clientSearch/v1"
xmlns="http://bank.com/xml/123/structureV098">
    <ns2:primaryGciSearchResponse>
        <ns2:familyClientName>ABCDEFG</ns2:familyClientName>
        <ns2:familyGCI>1234567890</ns2:familyGCI>
        <ns2:primaryGci>1234567890</ns2:primaryGci>
        <ns2:primaryClientName>ABCDEFG</ns2:primaryClientName> <ns2:city>ANYTOWN</
        ns2:city>
        <ns2:state>NEW YORK</ns2:state>
    </ns2:primaryGciSearchResponse>
</ns2:clientSearchResponseType>
```

FIG. 13

Multiple Role Selection

```
string  sOldRole  = AutoUpdater . PreviousRole(appName);
cboRole.DataSource  =  Roles;
if   (Roles. Contains(sOldRole))
{
    cboRole. SelectedItem  =  sOldRole;
} else {
    cboRole. SelectedIndex  = 0;
}
cboRole. Visibile  =  (Roles. Count  ! = 1);
lblRole.Text  =  cboRole.SelectedValue.ToString();
```

```
        if (chkCORP.Checked)
        {
            picCORP.Visible = false;
            destFileName = VerifyFolder(txtOutputFolder.Text, "CORP") + "\
\CPTexcel.zip";
            PrepareFile(files.First().FullName, destFileName, customUiFile,"CORP",
"ribbonLoadedCORP");
            if (File.Exists(destFileName))
            {
```

```
private void PrepareFile(string sourceFileName, string destFileName, string customUiFile,
    string strLob, string strOnloadValue, bool blnGWIMPub = false)
{
    ChangeCover(sourceFileName, strLob);
    SetOnLoadValue(customUiFile, strOnloadValue);
    SetVersionValue (customUiFile, txtVersionNo.Text);
    UpdateCustomUiFile(sourceFileName, customUiFile);
    string strFlagFile = "";
    if (blnGWIMPub)
    {
        strFlagFile = SetGWIMPubValue(sourceFileName, "0"); //note that boolean values in open xml are stored as 0/1
        if (strFlagFile.Length > 0) UpdateSheetXMLFile(sourceFileName, strFlagFile);
    }
    else
    {
        strFlagFile = SetGWIMPubValue(sourceFileName, "1"); //reset for next LOB in case needed
        if (strFlagFile.Length > 0) UpdateSheetXMLFile(sourceFileName, strFlagFile);
    }
    //Build();
    CreateZipFile(destFileName, strFlagFile);
}
```

FIG. 18

```
private void ChangeCover(string sourceFileName, string strLob)
{
    var excel = new Microsoft.Office.interop.Excel.Application(); // { Visible = true };
    var wb = excel.Workbooks.Open(sourceFileName);

excel.Run("RibbonX.ChangeCover", strLob);
    excel.Run("UI_Code.HideAllSheets");
    wb.Save();
    wb.Close();
    excel.Quit();
}
```

FIG. 19

```
private void SetLoadValue(string workingFile, string strValue)
    {
        var doc = new XmlDocument();
        doc.Load(workingFile);

var customUi = doc.DocumentElement;
        if (customUi != null) customUi.SetAttribute("onLoad" , strValue);

doc.Save(workingFile);
    }
```

FIG. 20

```
        private void SetVersionValue(string workingFile, string
strValue)
        {
            var doc = new XmlDocument();
            doc.Load(workingFile);

var customUi = doc.DocumentElement;
            if (customUi != null)
            {
                XmlNode nodeRibbon;
                XmlNode nodeTabs;
                XmlNode nodeTab;
                XmlNode nodeGroup;
                XmlNode nodeBox;
                XmlNode nodeButton;
                bool blnFound = false;
                for (int i = 0; i < customUi.ChildNodes.Count; i++)
                {
                    nodeRibbon = customUi.ChildNodes[i];

if (nodeRibbon.NodeType == XmlNodeType.Element &&
nodeRibbon.Name == "ribbon")
                    {
                        //found the ribbon
                        for (int j = 0; j < nodeRibbon.ChildNodes.Count;
j++)
                        {
                            nodeTabs = nodeRibbon.ChildNodes[j];
                            if (nodeTabs.NodeType == XmlNodeType.Element
&& nodeTabs.Name == "tabs")
                            {
                                //found the tabs element
                                for (int k = 0; k <
nodeTabs.ChildNodes.Count; k++)
                                {
```

FIG. 21a

```
                                        nodeTab = nodeTabs.ChildNodes[k];
                                        if (nodeTab.NodeType ==
XmlNodeType.Element && nodeTab.Name == "tab")
                                        {
                                                //found the tab element
                                                for (int l = 0; l <
nodeTab.ChildNodes.Count; l++)
                                                {
                                                        nodeGroup =
nodeTab.ChildNodes[l];
                                                        if (nodeGroup.NodeType ==
XmlNodeType.Element &&
                                                                nodeGroup.Name ==
"group" &&
nodeGroup.Attributes["id"].Value == "rxVersion")
                                                        {
                                                                //found the version
group
                                                                for (int m = 0; m <
nodeGroup.ChildNodes.Count; m++)
                                                                {
                                                                        nodeBox =
nodeGroup.ChildNodes[m];
                                                                        if (nodeBox.NodeType
== XmlNodeType.Element &&
                                                                                nodeBox.Name ==
"box" &&
nodeBox.Attributes["id"].Value == "rxClientTransactionVbox122")
                                                                        {
                                                                                //found the box
in the version group
                                                                                for (int n = 0;
n < nodeBox.ChildNodes.Count; n++)
                                                                                {
                                                                                        nodeButton =
```

FIG. 21b

```
nodeBox.ChildNodes[n];
                                                           if
(nodeButton.NodeType == XmlNodeType.Element && nodeButton.Attributes["id"].Value == "rxLabelVersion2")
                                                    {
                                                        //found
the label with the version number nodeButton.Attributes["tag"].Value = "Version " + strValue;
                                                        blnFound
= true;
                                                        break;
                                                    }
                                                }
                                                break;
                                            }
                                        }
                                        break;
                                    }
                                }
                                if (blnFound) break;
                            }
                        }
                        if (blnFound) break;
                    }
                }
                if (blnFound) break;
            }
        }
    }
    doc.Save(workingFile);
    // if the customUi.ChildNodes(#).NodeType == "Comment" skip
it
```

FIG. 21c

```
            // if the customUi.ChildNodes(#).NodeType == "Element" make
sure Name = "ribbon"; data type = System.Xml.XmlNode
            // if the ribbon.ChildNodes(#).NodeType == "Comment" skip it
            // if the ribbon.ChildNodes(#).NodeType == "Element" make
sure Name = "tabs"
            // if the tabs.ChildNodes(#).NodeType == "Comment" skip it
            // if the tabs.ChildNodes(#).NodeType == "Element" make sure
Name = "tab"
            // if tab.Attributes(#).Name == "id" make sure Value =
"rxCPTuser" select this node
            // if tab.ChildNodes(#).NodeType == "Comment" skip it
            // if tab.ChildNodes(#).NodeType == "Element" make sure Name
= "group"
            // if group.Attributes(#).Name = "id" make sure Value ==
"rxVersion"
            // if group.ChildNodes(#).NodeType == "Comment" skip it
            // if group.ChildNodes(#).NodeType == "Element" make sure
Name = "box"
            // if box.Attributes(#).Name == "id" make sure Value =
"rxClientTransactionVbox122"
            // if box.ChildNodes(#).NodeType == "Comment" Skip it
            // if box.ChildNodes(#).NodeType == "Element" make sure Name
= "button"
            // if button.Attributes(#).Name == "id" make sure Value =
"rxLabelVersion2"
            // then button.SetAttribute("tag", "Version " + strValue)
                                }
```

FIG. 21d

```
private string SetGWIMPubValue(string workingFile, string strValue)
    {
        string strSheetID = "";
        string strCellID = "";
        using (ZipFile zip = ZipFile.Read(workingFile))
        {
            ZipEntry entryWorkbook = zip["xl/workbook.xml"];
            entryWorkbook.Extract(txtOutputFolder.Text,
ExtractExistingFileAction.OverwriteSilently);

string strWorkbookFile = txtOutputFolder.Text +
"/xl/workbook.xml";
            string strFlag59Ref = GetFlag59(strWorkbookFile);
//returns something like 28.C48
            string[] strFlag59Parts = strFlag59Ref.Split(new
string[] { "." }, StringSplitOptions.RemoveEmptyEntries);

if (strFlag59Parts.Length == 2)
            {
                strSheetID = strFlag59Parts[0];
                strCellID = strFlag59Parts[1];
                ZipEntry entryFlags = zip["xl/worksheets/sheet" +
strSheetID + ".xml"];
                entryFlags.Extract(txtOutputFolder.Text,
ExtractExistingFileAction.OverwriteSilently);
            }
            else
            {
                MessageBox.Show("Could not find flag 59 to properly
generate GWIM Public.  Please fix manually",
                    "Warning: GWIM Public Invalid!",
MessageBoxButtons.OK, MessageBoxIcon.Error);

return "";
            }
        } var flagFile = txtOutputFolder.Text + "/xl/worksheets/sheet"
+ strSheetID + ".xml";
        var doc = new XmlDocument();
        doc.Load(flagFile);
```

FIG. 22a

```
        XmlNode xmlFlagSheet = doc.DocumentElement;
        if (xmlFlagSheet != null)
        {
            XmlNodeList lstCells = doc.GetElementsByTagName("c");
            for (int c = 0; c < lstCells.Count; c++)
            {
                XmlNode nodeFlag59 = lstCells[c];
                if (nodeFlag59.Attributes["r"].Value == strCellID)
                {
                    XmlNode nodValue = nodeFlag59.FirstChild;
                    if (nodValue != null && nodValue.Name == "v")
                    {
                        nodValue.InnerText = strValue;
                        doc.Save(flagFile);
                        return flagFile;
                    }
                }
            }
        }

//if we're still here, we had trouble
        MessageBox.Show("GWIM Pub could not be created properly.");
        return "";

SECURE PACKAGING SOFTWARE AND DEPLOYMENT SYSTEM

CROSS-REFERENCE TO RELATED APPLICATION

This application is a non-provisional of U.S. Provisional Patent Application No. 62/246,666, filed Oct. 27, 2015, entitled "SECURITY SOFTWARE PACKAGING AND DEPLOYMENT SYSTEM."

FIELD OF THE INVENTION

This invention relates to software packaging. Specifically, this invention relates to secure packaging software.

BACKGROUND OF THE INVENTION

ClickOnce is a Microsoft packaging technology application that enables installing and running of a Windows-based client application. Typically it was used for customer-built applications. The installation and running is initiated by a user clicking a link in a web page. ClickOnce is a component of the Microsoft .NET framework 2.0 and later.

Previously the ClickOnce application was used for distribution of custom-built .NET Windows Framework applications or application files.

It may be desirable to utilize ClickOnce in connection with packaged applications, for example, Microsoft Excel™, Microsoft Word™, Microsoft PowerPoint™ and any other suitable packaged application.

It may also be desirable to utilize ClickOnce in connection with packaged application files, for example a Microsoft Excel™ spreadsheet, a Microsoft Word™ document, a Microsoft PowerPoint™ presentation or any other suitable packaged application file.

There may be difficulties in adapting ClickOnce to packaged applications and packaged application files. One difficulty may be incorporating the ClickOnce computer-readable code into a packaged application or application file. A developer may be unable to access the computer-readable code in a packaged application or application file. Therefore, it would be desirable to incorporate the ClickOnce functionality into a packaged application or application file using a wrapper application.

It would also be desirable for the wrapper application to ensure access of the application only to authorized users. It would desirable for such a wrapper application to enable deployment of the packaged application on DEV (developments), SIT (system integration test), UAD (user acceptance test), and PROD (production) environments.

SUMMARY OF THE DISCLOSURE

A wrapper application for enabling Microsoft™ ClickOnce to operate in a compatible manner with, inter alia, a Microsoft™ spreadsheet is provided. The wrapper application may include a client profitability tool ("CPT") updater. The updater may include a translation module. The translation module may provide a platform for communication with ClickOnce via a computer-readable language—i.e., high-level programming code. The translation module may also provide a platform for communication with the spreadsheet via a computer-readable language. The computer-readable language may be compatible with ClickOnce and with the spreadsheet.

In some embodiments, the computer-readable language may be the language of the spreadsheet application. In these embodiments, a code segment that enables the ClickOnce application to communicate with the computer-readable language may be provided. A code segment that enables the ClickOnce application to communicate with the computer-readable language may ensure the compatibility of ClickOnce with the spreadsheet application. The computer-readable code elements should preferably be compatible when combining computer-readable code elements. The Microsoft™ .Net framework may enable combination of a plurality of code elements from different .Net computer-readable languages, such as C#, C++, Visual Basic, etc. The combination process of .Net code elements may take place on the .Net framework.

Combining code elements on the .Net framework may be easier and less time consuming than combining code elements of diverse languages, such as combining code elements from Java™ and C# to produce a single computer-readable program. Combining code elements of diverse languages may require converting each code element to machine language and then reconverting the combined code into a high-level computer-readable language.

In some embodiments, the computer-readable language may be the language of the ClickOnce application. In these embodiments, a code segment that enables the spreadsheet to communicate with the ClickOnce application may be required.

In some embodiments, the computer-readable language may be neither the language of the ClickOnce application nor the language of the spreadsheet application. In these embodiments, the spreadsheet and the ClickOnce application may require conversion and/or translation into the computer-readable language.

The CPT updater may also include a three-level security module. The three-level security module may include a first level. The first level may be for self-deleting the CPT updater upon receipt of an unauthorized attempt to access the CPT updater. The three-level security module may also include a second level. The second level may prevent users from running the CPT updater for the wrong sub-entity. The prevention may include terminating the CPT updater if a predetermined file in unavailable on a user's computing device. The third level may include encoding a password of the spreadsheet in a mathematical formula. The third level may also include storing a decrypt key to the mathematical formula in a non-descriptive variable name.

In some embodiments, the security module may have one level, two levels, four levels or any other suitable number of levels.

At times, an administrative team may act as upper-level technical application support. Administrators may self-define what role they want to take on. The self-defining may enable the administrative personnel to emulate the same experience as a non-administrative user, simply by logging in to the CPT updater as a different role. This functionality may enable the administrators to assist the non-administrative users in the non-administrative user's specific role.

The CPT updater may also include an administration module. The administration module may enable an administrative user to adopt one of a plurality of roles while logging into the CPT updater. The administration module may also enable the administrative user to emulate a non-administrative user's experience with the CPT updater. The non-administrative user may be associated with one of the plurality of roles.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows a section of computer-readable code according to certain embodiments;

FIG. 2 shows another section of computer-readable code according to certain embodiments;

FIG. 3 shows yet another a section of computer-readable code according to certain embodiments;

FIG. 4 shows a display of a message to a user according to certain embodiments;

FIG. 5 shows a section of computer-readable code according to certain embodiments;

FIG. 6 shows another section of computer-readable code according to certain embodiments;

FIG. 7 shows a message which may be displayed to a user according to certain embodiments;

FIG. 8 shows a section of computer-readable code according to certain embodiments;

FIG. 9 shows another section of computer-readable code according to certain embodiments;

FIG. 10 shows a section of computer-readable code which may be an example of a web service request format according to certain embodiments;

FIG. 11 shows a section of computer-readable code according to certain embodiments;

FIG. 12 shows another section of computer-readable code according to certain embodiments;

FIG. 13 shows yet another section of computer-readable code according to certain embodiments;

FIG. 18 shows a another section of computer-readable code according to certain embodiments;

FIG. 19 shows yet another section of computer-readable code according to certain embodiments;

FIG. 20 shows still another section of computer-readable code according to certain embodiments;

FIGS. 21a, 21b 21c, and 21d show yet another section of computer-readable code according to certain embodiments; and FIGS. 22a and 22b show still another section of computer-readable code according to certain embodiments.

DETAILED DESCRIPTION OF THE DISCLOSURE

Figures 14, 15:
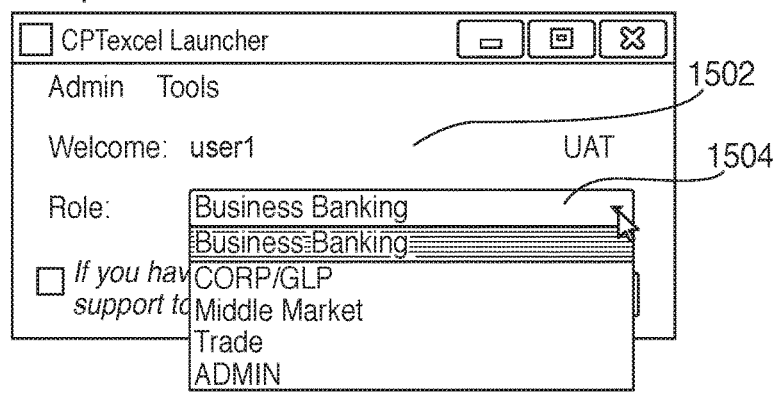
FIG. 14 shows still another section of computer-readable code according to certain embodiments.
FIG. 15 shows a screenshot a multiple role welcome graphical user interface ("GUI") according to certain embodiments.

For the purposes of this application, a spreadsheet may be understood to mean an interactive computer application for organization, structuring, analysis and storage of data in tabular format. The application may operate on data represented as cells in a two-dimensional array. Each cell may contain numeric data, text data or any other suitable data. The data may be entered into a spreadsheet by a user, computer, automaton or any other suitable method. Results of formulas, included in cells of the spreadsheet, may be continually updated and the value displayed based on the contents of other cells. Using the spreadsheet application, a user may create a spreadsheet, enter data into the spreadsheet, and manipulate the data included in the spreadsheet.

ClickOnce may be a Microsoft™ application that enables a user to install and run a Windows application by selecting a link on a web page. ClickOnce may ease the deployment of Windows applications. In addition, ClickOnce may solve three other problems with conventional deployment models: the difficulty in updating the deployed application, the impact of an application of the user's computer and the need for administrator permissions to install applications.

ClickOnce applications are considered low-impact—i.e., the applications are installed per user—not per machine. Administrator privileges are not required to install a ClickOnce application. Each ClickOnce application may be isolated from the others—i.e., one ClickOnce application may be unable to interfere with the functioning of another ClickOnce application. The ClickOnce model supports installed applications and online applications—i.e., browser-hosted applications that are simply run and cached—not installed. ClickOnce can be deployed to a computer from a Web location, a network sharing system or a file location—e.g., a compact disk, flash drive, mass storage device, hard drive, etc.

ClickOnce deployment may be controlled by means of two XML manifest files: a deployment manifest and an application manifest. The deployment manifest, or *.application file, may describe the deployment model. The deployment model may include the current version, the update behavior, the publisher identity and a digital signature. The deployment manifest may be intended to be authored by administrators handling deployment. The application manifest, or *.exe.manifest file, may describe the application assemblies, dependent libraries and list permissions required by the application. The application manifest may be authored by the application developer. In order to launch ClickOnce, a user may select the deployment manifest file.

ClickOnce applications may be self-updating—i.e., the applications can check for newer versions as the newer versions become available and automatically replace any updated file.

A CPT updater may be a wrapper application that tailors the capabilities of the ClickOnce application to function with a Microsoft™ Excel spreadsheet. The combination of ClickOnce and an Excel spreadsheet, via the CPT updater, may enable a plurality of users to view and utilize a specific spreadsheet. The combination may also enable the spreadsheet to be continually updated, via the ClickOnce functionality. The combination may also restrict a user's usage of the spreadsheet. For example, the combination may restrict a user from transmitting the spreadsheet to another user. Another example may be that the combination may enable a user to only view specific sheets in the spreadsheet based on the user's LOB (line of business). Another example may be that the combination may restrict a user from viewing the spreadsheet because the user does not possess the required entitlements.

A method for enabling ClickOnce to operate in a compatible manner with a spreadsheet may be provided. The method may include providing a platform for communication with ClickOnce via a computer-readable language. This may be implemented via a CPT updater. The converting may include using a code element that serves as a communication link between the ClickOnce application and the spreadsheet. The computer-readable language may be compatible with a spreadsheet.

The method may include self-deleting the CPT updater upon receipt of an unauthorized attempt to access the CPT updater. The method may also include preventing users from executing the CPT updater for the wrong sub-entity. The method may include terminating the CPT updater if a predetermined file is unavailable on a user's computer. The predetermined file may inform the system of the user's sub-entity.

In some embodiments, the predetermined file may include a field. The field may include the name of the sub-entity. In these embodiments, the method may include obtaining the contents of the field and determining the user's sub-entity based on the field contents.

The method may also include encoding a password of the spreadsheet in a mathematical formula. The password of the spreadsheet may enable access to the spreadsheet.

The method may also include storing a decrypt key to the mathematical formula in a non-descriptive variable name.

The method may also include enabling an administrative user to adopt one of a plurality of roles while logging into the CPT updater. The method may also include emulating, by the administrative user, a non-administrative user's experience of the CPT updater. The non-administrative user may be associated with one of the plurality of roles.

The method may also include presenting the administrative user with a multiple-role-welcome graphical user interface ("GUI") when the administrative user successfully logs into the CPT updater. The method may also include displaying, on the multiple-role-welcome GUI, a name of the administrative user. The method may also include displaying, on the multiple-role-welcome GUI, a combination choice box. The combination choice box may be located directly on top of a role label. The combination choice box may include a plurality of roles.

The combination choice box may be located directly on top of the role label. Therefore, when a visibility attribute of the multiple-role-welcome GUI is set to true, a user may only view the multiple-role-welcome GUI—not the role label. When the visibility attribute of the multiple-role-welcome GUI is set to false and a visibility attribute of the role label is set to true, a user may view the role label.

The method may include enabling the administrative user to select one of the plurality of roles from the combination choice box. The method may also include opening the CPT updater with a set of permissions assigned to the selected role.

The method may also include setting a visibility attribute of the combination choice box to false, thereby enabling viewing the role label, when a non-administrative user successfully logs into the CPT updater. The method may also include displaying the multiple-role-welcome GUI to the non-administrative user. The method may also include displaying a name of the non-administrative user and the non-administrative user's role on the multiple-role-welcome GUI.

The method may also include customizing the CPT updater. The customizing may include opening the spreadsheet into a compressed file structure. In some embodiments, the spreadsheet may be a compressed file structure of XML documents. The method may also include opening a specified XML file included in the file structure. The method may also include opening a named range within the specified XML file. A named range may be a section of cells in the spreadsheet. One cell in the named range may be an entitlement flag. If the cell is set to true, the spreadsheet may be able to access a specific database. If the cell is set to false, the spreadsheet may be barred from accessing the specific database. The method may also include setting the entitlement flag to true if the user has a required entitlement. The method may also include setting the entitlement flag to false if the user does not have the required entitlement.

The method may also include customizing the cover sheet of the spreadsheet. The customizing may include calling a plurality of macros included in the spreadsheet. The customizing may also include identifying, via a first macro included in the plurality of macros, an LOB associated with the user. The customizing may also include identifying, via a second macro, included in the plurality of macros, a cover sheet, included in the spreadsheet, associated with the identified LOB. The customizing may include hiding, via a third macro included in the plurality of macros, any remaining sheets, or cover sheets, included in the spreadsheet. The customizing may also include making the cover sheet visible, via a fourth macro included the plurality of macros. In some embodiments, making the cover visible may be equivalent to setting the visibility attribute of the cover sheet to true.

The method may also include customizing the ribbon of the cover sheet. The customizing may be performed based on the LOB of the user. The customizing may include opening the specified XML file. The customizing may also include altering text. The text may be configured to appear within the ribbon the spreadsheet. The ribbon of the spreadsheet may be associated with a customer user interface ("UI") component of the compressed file structure.

The method may also include customizing the ribbon version. The customizing may ensure that a correct version of the ribbon, is displayed on the ribbon of the spreadsheet.

The method may also include packaging the spreadsheet as a compressed file and storing it as a binary large object ("BLOB"). A BLOB may be a collection of binary data stored as a single entity in a database management system.

The method may also include transmitting the BLOB, and utilizing the ClickOnce functionality included in the BLOB, to a plurality of users.

The method may also include transmitting updates to the BLOB, and utilizing the ClickOnce functionality included in the BLOB, to the plurality of users.

The method may also include the plurality of users retrieving the BLOB. Upon retrieval of the BLOB, the plurality of users may unpack the BLOB and utilize its contents.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows a section of computer-readable code. The computer-readable code may check the role or credentials of a user attempting to access the CPT updater. The role or credentials of the user may preferably be verified prior to enabling access of the CPT updater to the user.

FIG. 2 shows a section of computer-readable code. The computer-readable code may include method call A. Method call A may be enable retrieval of a user's credentials. Method call A may also place the user's credentials in a usrRoles variable.

FIG. 3 shows a section of computer-readable code. The computer-readable code may include method B. Method B may show a failure during checking of a user entitlement may cause deletion of the entire CPT updater installation. Upon deletion of the CPT updater, a user may be presented with a display.

FIG. 4 shows a display which may be presented to the user following a failure of method B. The message may be "You do not have entitlements to access this application. Contact your system administrator."

FIG. 5 shows a section of computer-readable code. The section of computer-readable code may include method C. Method C shows terminating the CPT updater without notifying the user. If a user obtains a copy of the CPT updater from a user outside of the CPT updater control, the system may terminate the CPT updater without notifying the user, as shown in method C. The internal CPT security module may prevent users from running the CPT updater for the wrong LOB or other sub-entity. A user may be unaware that a CPTexcel.vsto file may be required to run the CPT updater. Therefore, if a user obtains a copy of the CPT updater outside of the CPT updater's control, method C may be performed.

FIG. 6 shows a section of computer-readable code. The section of computer-readable code shows self-deletion of the CPT updater. The security module may perform universal security framework ("USF") validation. The USF validation may prevent a user from possessing a copy of the CPT updater if the user is not authorized to possess such a copy. A user may obtain a copy of the CPT updater outside of the CPT updater control, in an attempt to bypass the CPT updater's security module. In such an attempt, the CPT updater may delete itself. Method D, included in FIG. 6, may execute and CPT updater may be deleted. Self-deleting may include transmitting a message to a CPU (central processing unit) to write, utilizing a computer's read-write head, over the portion of memory which held the CPT updater.

FIG. 7 shows displaying a message to an unauthorized user. The message may be "You are not authorized to use this application."

Many secure spreadsheets utilize a "backdoor" password that may enable access of locked spreadsheets to administrative users. Typically, this password is embedded in either a worksheet of VBA module. Some users may manually search for this password in worksheets of Visual Basic for Application ("VBA") code. Access to these passwords may allow users to view and change calculations in the worksheets.

In some embodiments, the password may be encoded using a complex mathematical formula. The encoded password may be stored in a VBA module. The key to decrypt the encoded password may be given a non-descriptive variable name. The string used to store the passwords may also be given a non-descriptive variable name. One possible encoding method may be shown in FIG. 8.

The ability to unlock the application may be triggered by use of a hidden form also given a non-descript name. FIG. 9 shows a decrypt algorithm that may be implemented with computer-readable code.

The system may also include using web services to connect to data sources. This may enable CPT updater users to access sensitive client data that resides on data systems without enabling users to access the actual databases.

CPT uses Microsoft XML v6.0 library (msxml6.dll) to connect to data sources. The Microsoft XML v6.0 library contains Windows HTTP services to access web services. This library is distributed by Microsoft with many of its products (e.g., IE, Office, etc.). The library has been adapted to be used with VBA and CPT. An example of the web service request format is shown in FIG. 10. The requested XML may be constructed from VBA code, as shown in FIG. 11. The request is then sent to the web service using XMLHTTP class from the library, as shown in FIG. 12. The responseText XML format may also be defined by the web service, as shown in FIG. 13. The responseText may also be readily parsed with the Microsoft XML v6.0 library, as shown also in FIG. 13.

FIG. 14 shows computer-readable code. The computer-readable code may include adding the roles of a user to a multiple-role-welcome GUI combination choice box. The computer-readable code may also include setting a visibility attribute of the combination choice box to true.

FIG. 15 shows a multiple-role-welcome GUI. The multiple-role-welcome GUI shows the name of the administrative user, at 1502. The multiple-role-welcome GUI also shows a combination choice box, at 1504. The combination choice box may include a plurality of roles such as business banking, CORP/GLP, middle market, trade and admin. The administrative user may have selected to emulate the experience of business banking user.

Figures 16, 17:
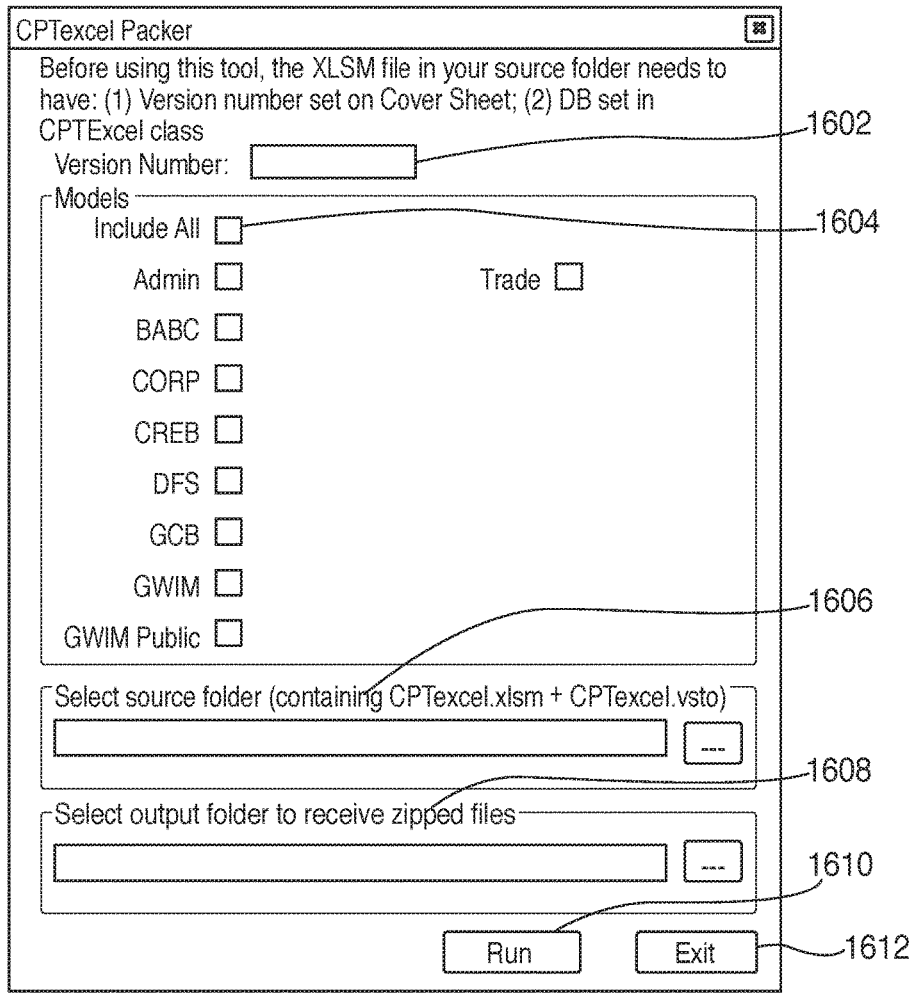
FIG. 16 shows a packer screenshot according to certain embodiments.
FIG. 17 shows a section of computer-readable code according to certain embodiments.

FIG. 16 shows a CPT Excel Packer GUI. The GUI may enable a user to input a spreadsheet. The GUI may pack, or incorporate the CPT updater capabilities into the spreadsheet. The GUI may store the spreadsheet in a specified file location. Version number entry box 1602 shows a user to enter the version number of the spreadsheet to be inputted. LOB checkboxes 1604 enables a user to check which LOB(s) is associated with this spreadsheet. Folder browse field 1606 enables the user to browse a computer to select a folder to pack. Folder browse field 1608 enables the user to select a folder to place the packed folder. Button 1610 enables a user to run the program. Button 1612 enables a user to exit the program.

FIG. 17 shows a main program for the packer shown in FIG. 16. A main program may be computer-readable code that may run, as opposed to methods that may be called from other methods. The main program may include calling a prepare file code line. The prepare file code line may prepare the file or spreadsheet for the user. The prepare file method may be shown in FIG. 18.

FIG. 18 shows computer-readable code. The computer-readable code may include a prepare file method. The prepare file method may call a change cover method (FIG. 19), a set on load value method (FIG. 20), a set version value method (FIGS. 21a-21d) and a set GWIM public value method (FIG. 22a and 22b).

FIG. 19 shows a change cover method. The change cover method may accept the parameters: source file name and LOB string. The change cover method may call the macros in the workbook to update the cover sheet with the correct LOB cover sheet. The change cover method may set the visibility attribute of the correct LOB cover sheet to true.

FIG. 20 shows a set on load value method. The set on load value method may accept the parameters: working file and string value. The set on load value method may customize the ribbon by altering text in the custom UI component of a file included in the compressed file structure.

FIGS. 21a-21d show a set version value method. The set version value method may update the customer UI component to ensure the correct version displays on the ribbon of the spreadsheet.

FIGS. 22a and 22b show a set GWIM public value method. The GWIM sets the entitlement flag included in the named range. Setting the entitlement flag to true allows database searching for user associated with specific LOBs. Setting the entitlement flag to false forbids database searching for users associated with other specific LOBs. In some instances, a user may have restricted access to the database—i.e., the user may be able to perform some database actions, although not all of the database actions.

Thus, methods and apparatus for a rules engine have been provided. Persons skilled in the art will appreciate that the present invention can be practiced by other than the described embodiments, which are presented for purposes of illustration rather than of limitation, and that the present invention is limited only by the claims that follow.

What is claimed is:

1. A wrapper application for enabling Microsoft™ Click-Once (hereinafter, "ClickOnce"), being deployed from a hard drive to a computer, to operate in a compatible manner with a Microsoft Excel™ spreadsheet (hereinafter, "spreadsheet"), said wrapper application comprising:
a client profitability tool ("CPT") updater, said updater comprising:
a translation module that provides a platform for communication between the spreadsheet and ClickOnce, said ClickOne being deployed from the hard drive the computer, said ClickOne deployment being controlled by two eXtensible Markup Language ("XML") manifest files, said two XML manifest files including a deployment manifest file and an application mainfest file, said deployment manifest file comprising a current version, update behavior, publisher identity and a digital signature, said application manifest file describing a plurality of application assemblies, a plurality of dependent libraries and a plurality of list permissions required by an application, wherein a user selects the deployment manifest file in order to launch ClickOnce, said platform comprising computer-readable language that is compatible with ClickOnce and with the spreadsheet;
a three level security module, said module comprising:
a first level for self-deleting the CPT updater upon receipt of an unauthorized attempt to access the CPT updater;
a second level for preventing users from running the CPT updater for a wrong sub-entity by terminating the CPT updater if a predetermined file in unavailable on a user's computing device;
a third level for encoding a password of the spreadsheet in a mathematical formula and storing a decrypt key to the mathematical formula in a non-descriptive variable name;
an administration module that enables an administrative user to:
adopt one of a plurality of roles while logging into the CPT updater; and
emulate a non-administrative user's experience of the CPT updater, said non-administrative user associated with one of the plurality of roles.

2. The application of claim 1, wherein when the administrative user successfully logs into the CPT updater, the administrative user is presented with a multiple-role-welcome graphical user interface ("GUI"), said multiple-role-welcome GUI comprising:
a name of the administrative user; and
a combination choice box, said combination choice box located directly on top of a role label, said combination choice box including the plurality of roles, said combination choice box enabling the administrative user to select one of the plurality of roles, said selected role becoming the adoptive role.

3. The application of claim 2, wherein when the non-administrative user successfully logs into the CPT updater, the non-administrative user is presented with the multiple-role-welcome graphical user interface ("GUI") with a visibility attribute of the combination choice box set to false, said multiple-role-welcome GUI comprising:
a name of the non-administrative user; and
the role label, said role label enabling the non-administrative user to view the non-administrative user's role.

4. The application of claim 1, wherein the application further comprises a customization module, said customization module comprising:
a file opener configured to:
open the spreadsheet into a compressed file structure;
open a specified XML file included in the file structure;
open a named range within the specified XML file;
set an entitlement flag, included within the named range, to true if the user has a required entitlement; and
set the entitlement flag to false if the user does not have the required entitlement.

5. The application of claim 4, wherein the customization module further comprises:
a cover sheet customizer configured to:
call a plurality of macros included in the workbook, said plurality of macros configured to:
identify a line of business ("LOB") associated with the user;
identify a cover sheet, included in the spreadsheet, associated with the identified LOB;
hide any remaining sheets in the spreadsheet; and
make the cover sheet visible.

6. The application of claim 5, wherein the customization module further comprises:
a ribbon customizer configured to:
open the specified XML file;
alter text, said text being configured to appear within a ribbon of the spreadsheet, in a custom user interface ("UI") component of the compressed file structure.

7. The application of claim 6, wherein the customization module further comprises a ribbon version customizer configured to ensure the correct version is displayed on the ribbon of the spreadsheet.

8. A wrapper application for enabling Microsoft™ ClickOnce (hereinafter, "ClickOnce"), being deployed from a hard drive to a computer, to operate in a compatible manner with a Microsoft Excel™ spreadsheet (hereinafter, "spreadsheet") comprising:
a client profitability tool ("CPT") updater, said updater comprising:
a translation module that provides a platform of communication between ClickOnce, said ClickOnce being deployed from the hard drive to the computer, said ClickOnce deployment being controlled by two eXtensible Markup Language ("XML") manifest files, said two XML manifest files including a deployment manifest file and an application manifest file, said deployment manifest file comprising a current version, update behavior, publisher identity and a digital signature, said application manifest file describing a plurality of application assemblies, a plurality of dependent libraries and a plurality of list permissions required by an application, wherein a user selects the deployment manifest file in order to launch ClickOnce, and the spreadsheet, said platform comprising a computer-readable language, said computer-readable language that is compatible with the spreadsheet, said translation module packaging the spreadsheet and the ClickOnce as a compressed file and storing the compressed file as a binary large object ("BLOB");
a three level security module, said module comprising:
a first level for self-deleting the CPT updater upon receipt of an unauthorized attempt to access the CPT updater;
a second level for preventing users from running the CPT updater for a wrong sub-entity by terminating the CPT updater if a predetermined file in unavailable on a user's computing device;
a third level for encoding a password of the spreadsheet in a mathematical formula and storing a decrypt key to the mathematical formula in a non-descriptive variable name;
an administration module that enables an administrative user to:
adopt one of a plurality of roles while logging into the CPT updater; and
emulate a non-administrative user's experience of the CPT updater, said non-administrative user associated with one of the plurality of roles.

9. The application of claim 8, wherein when the administrative user successfully logs into the CPT updater, the administrative user is presented with a multiple-role-welcome graphical user interface ("GUI"), said multiple-role-welcome GUI comprising:
a name of the administrative user; and
a combination choice box, said combination choice box located directly on top of a role label, said combination choice box including the plurality of roles, said combination choice box enabling the administrative user to select one of the plurality of roles, said selected role becoming the adoptive role.

10. The application of claim 9, wherein when the non-administrative user successfully logs into the CPT updater, the non-administrative user is presented with the multiple-role-welcome graphical user interface ("GUI") with a visibility attribute of the combination choice box set to false, said multiple-role-welcome GUI comprising:
a name of the non-administrative user; and
the role label, said role label enabling the non-administrative user to view the non-administrative user's role.

11. The application of claim 8, wherein the application further comprises a customization module, said customization module comprising:
a file opener configured to:
open the spreadsheet into a compressed file structure;
open a specified XML file included in the file structure;
open a named range within the specified XML file;
set an entitlement flag, included within the named range, to true if the user has a required entitlement; and
set the entitlement flag to false if the user does not have the required entitlement.

12. The application of claim 11, wherein the customization module further comprises:
a cover sheet customizer configured to:
call a plurality of macros included in the workbook, said plurality of macros configured to:
identify a line of business ("LOB") associated with the user;
identify a cover sheet, included in the spreadsheet, associated with the identified LOB;
hide any remaining sheet in the spreadsheet; and
make the cover sheet visible.

13. The application of claim 12, wherein the customization module further comprises:
a ribbon customizer configured to:
open the specified XML file;
alter text, said text being configured to appear within a ribbon of the spreadsheet, in a custom user interface ("UI") component of the compressed file structure.

14. The application of claim 13, wherein the customization module further comprises a ribbon version customizer configured to ensure the correct version is displayed on the ribbon of the spreadsheet.

15. A method for enabling Microsoft™ ClickOnce (hereinafter, "ClickOnce"), being deployed from a hard drive to a computer, to operate in a compatible manner with a Microsoft Excel™ spreadsheet (hereinafter, "spreadsheet"), the method comprising:
providing a platform, at a client profitability tool ("CPT") updater, for ClickOnce to operate in a manner compatible with the spreadsheet, said ClickOnce being deployed from the hard drive to the computer, said ClickOnce deployment being controlled by two eXtensible Markup Language ("XML") manifest files, said two XML manifest files including a deployment manifest file and an application manifest file, said deployment manifest file comprising a current version, update behavior, publisher identity and a digital signature, said application manifest file describing a plurality of application assemblies, a plurality of dependent libraries and a plurality of list permissions required by an application, wherein a user selects the deployment manifest file in order to launch ClickOnce;

self-deleting the CPT updater upon receipt of an unauthorized attempt to access the CPT updater;
preventing users from running the CPT updater for a wrong sub-entity by terminating the CPT updater in a predetermined file is unavailable on a user's computing device;
encoding a password of the spreadsheet in a mathematical formula;
storing a decrypt key to the mathematical formula in a non-descriptive variable name;
enabling an administrative user to adopt one of a plurality of roles while logging into the CPT updater;
emulating, by the administrative user, a non-administrative user's experience of the CPT updater, said non-administrative user associated with one of the plurality of roles.

16. The method of claim 15, further comprising:
presenting the administrative user with a multiple-role-welcome graphical user interface ("GUI") when the administrative user successfully logs into the CPT updater;
displaying, on the multiple-role-welcome GUI, a name of the administrative user;
displaying, on the multiple-role-welcome GUI, a combination choice box, said combination choice box located directly on top of a role label, said combination choice box including the plurality of roles;
enabling the administrative user to select one of the plurality of roles from the combination choice box; and
opening the CPT updater with a set of permissions assigned to the selected role.

17. The method of claim 16, further comprising:
setting a visibility attribute of the combination choice to false, thereby enabling viewing of the role label, when a non-administrative user successfully logs into the CPT updater;
displaying the multiple-role-welcome GUI to the non-administrative user; and
displaying a name of the non-administrative user and the non-administrative user's role on the multiple-role welcome GUI.

18. The method of claim 15, further comprising:
customizing the CPT updater, said customizing comprising:
opening the spreadsheet into a compressed file structure;
opening a specified XML file included in the file structure;
opening a named range within the specified XML file;
setting an entitlement flag, included within the named range, to true, if the user has a required entitlement;
setting the entitlement flag to false if the user does not have the required entitlement.

19. The method of claim 18, further comprising:
customizing the cover sheet of the spreadsheet, said customizing comprising:
calling a plurality of macros included in the workbook;
identifying, via a first macro included in the plurality of macros, a line of business ("LOB") associated with the user;
identifying, via a second macro included in the plurality of macros, a cover sheet, included in the spreadsheet, associated with the identified LOB;
hiding, via a third macro included in the plurality of macros, any remaining sheets included in the spreadsheet; and
making the cover sheet visible, via a fourth macro included in the plurality of macros.

20. The method of claim 19, further comprising:
customizing the ribbon of the cover sheet, said customizing of the ribbon comprising:
opening the specified XML file;
altering text, said text being configured to appear within a ribbon of the spreadsheet, in a customer user interface ("UI") component of the compressed file structure.

21. The method of claim 20, further comprising:
customizing the ribbon version, said customizing ensuring that a correct version is displayed on the ribbon of the spreadsheet.

* * * * *